United States Patent [19]

Tsuge et al.

[11] Patent Number: 4,688,849
[45] Date of Patent: Aug. 25, 1987

[54] CHILD PASSENGER SECURING APPARATUS FOR USE IN VEHICLE

[75] Inventors: Hiroshi Tsuge; Akinori Fujiwara; Noritada Yoshitsugu; Motonobu Sugiura, all of Aichi, Japan

[73] Assignees: Kabushiki Kaisha Tokai-rika-denki-seisakusho; Toyota Jidosha Kabushiki Kaisha, both of Aichi, Japan

[21] Appl. No.: 819,263

[22] Filed: Jan. 16, 1986

[30] Foreign Application Priority Data

Jan. 18, 1985 [JP] Japan ................................. 60-4917

[51] Int. Cl.⁴ .............................................. A47C 1/08
[52] U.S. Cl. .................... 297/250; 297/483; 297/475
[58] Field of Search ............... 297/250, 479, 475, 488, 297/483, 489, 216, 478

[56] References Cited

U.S. PATENT DOCUMENTS

| | | | |
|---|---|---|---|
| 3,695,696 | 10/1972 | Lohr et al. | 297/475 |
| 3,910,634 | 10/1975 | Morris | 297/484 X |
| 4,037,873 | 7/1977 | Weman | 297/475 |
| 4,130,252 | 12/1978 | Mori et al. | 297/478 X |
| 4,436,341 | 3/1984 | Converse | 297/250 |
| 4,545,613 | 10/1985 | Martel et al. | 297/250 |

FOREIGN PATENT DOCUMENTS 3022005 12/1980 Fed. Rep. of Germany ...... 297/474

Primary Examiner—Peter A. Aschenbrenner
Attorney, Agent, or Firm—Sixbey, Friedman & Leedom

[57] ABSTRACT

A child passenger securing apparatus for use in a vehicle includes a body which has a seat portion and a backrest portion and which defines a hollow portion extending from the seat portion to the backrest portion. A portion of a webbing unwound from a retractor secured within the hollow portion of the seat portion is passed through the hollow portion and led out from a lead-out portion provided in the backrest portion so that a child passenger is fastened by this portion of the webbing. Accordingly, the webbing is prevented from contacting a seat for an adult passenger on which the apparatus is mounted, so that the webbing moves smoothly when it is unwound and rewound.

13 Claims, 2 Drawing Figures

4,688,849

CHILD PASSENGER SECURING APPARATUS FOR USE IN VEHICLE

BACKGROUND OF THE INVENTION

1. Field of the Invention

The present invention relates to a child passenger securing apparatus for use in a vehicle which is designed to protect a child passenger by restraining his body.

2. Description of the Related Art

Most road vehicles are provided with a restraining webbing for fastening an occupant seated in a seat. Since this type of restraining webbing is generally disposed with a view to being used by an adult passenger when he is seated, the disposition of the webbing is not always appropriate for a child passenger.

In order to overcome the above disadvantage, child passenger securing apparatuses have already been proposed wherein the apparatus body is mounted on a seat of a vehicle and secured to the seat by a restraining webbing and a child passenger is seated in this body and fastened by a restraining means, exclusively for a child passenger, which is provided on the body so that he is protected in an appropriate condition. One type of conventional child passenger securing apparatus employs a retractor for winding up the restraining means. In this type of apparatus, the retractor is mounted at the rear of the backrest portion of the apparatus body, and the distal or leading end of the restraining means unwound from the retractor is passed over the rear portion of the apparatus body and led out to the vicinity of the shoulders of the child passenger.

For this reason, the thickness of the backrest portion needs to be reduced so that when the apparatus body is mounted on a seat for an adult passenger, a portion of the restraining means passing behind the apparatus body will not contact the seat. In the case of a backrest portion with a relatively large thickness, said portion of the restraining means contacts the seat, thus causing friction to occur between the seat and the restraining means when unwound and rewound. It may be considered employing an arrangement in which the backrest portion is formed with a relatively large thickness, and the thickness of only a portion thereof along which the restraining means passes is reduced. This arrangement, however, has the disadvantage that the apparatus body cannot be molded with high efficiency.

SUMMARY OF THE INVENTION

In view of the above circumstances, it is a primary object of the present invention to provide a child passenger securing apparatus so designed that it is possible to increase the thickness of the backrest portion of the apparatus body and prevent a portion of the restraining means passed over the backrest portion from contacting the seat for an adult passenger.

To this end, the present invention provides a child passenger securing apparatus which comprises: a body having a seat portion for seating a child passenger and a backrest portion; a retractor accommodated within the body; restraining means having one end thereof wound up into the retractor and the other end passed over the rear portion of the body and led out from a lead-out portion to the vicinity of the shoulders of the child passenger; a buckle device for disengageably connecting the other or second end of the restraining means to the body; and a cover portion which accommodates a portion of the restraining means extending from the retractor to the vicinity of the lead-out portion.

Accordingly, it is possible by virtue of the cover portion to increase the thickness of the backrest portion of the body and prevent a portion of the restraining means positioned at the rear of the backrest portion from contacting a seat for an adult passenger on which the apparatus is mounted, so that the restraining means moves smoothly when it is unwound and rewound.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which.

DESCRIPTION OF THE PREFERRED EMBODIMENT

Figure 1:
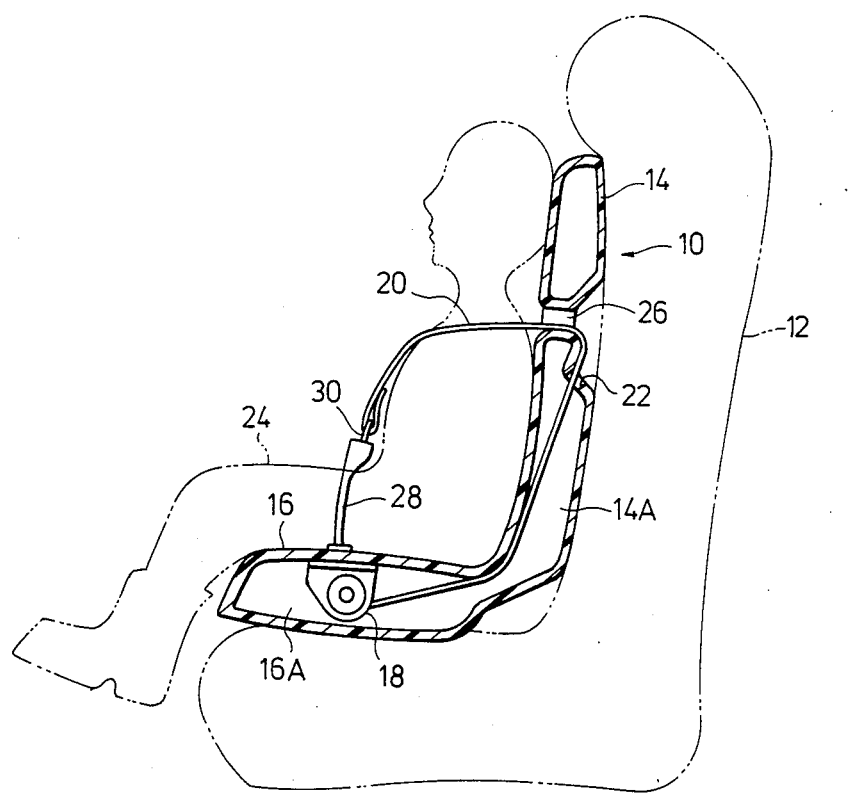
FIG. 1 is a sectional view of one embodiment of the child passenger securing apparatus according to the present invention.

FIG. 1 shows a child passenger securing apparatus 10 in accordance with one embodiment of the present invention which is mounted on a seat 12 for an adult passenger. The apparatus 10 is secured to the seat 12 by means of an adult passenger restraining webbing which is provided on the seat 12 in advance.

The apparatus 10 includes a body having a backrest portion 14 and a seat portion 16 which are integrated in the form of a thin-walled shell construction. Hollow portions 14A and 16A which are communicated with each other are formed inside the body. If necessary, a side wall may be integrally provided at each lateral end of the body including the backrest and seat portions 14 and 16 such that the side wall extends longitudinally of the vehicle.

A retractor 18 is accommodated and secured within the hollow portion 16A of the seat portion 16. This retractor 18 has a structure similar to that of a retractor for winding up an occupant restraining webbing which is employed in a seatbelt system for an adult passenger. The retractor 18 winds up one end of a webbing 20 thereinto by means of a biasing force, the webbing 20 serving as a restraining means. The retractor 18 incorporates an inertia type lock mechanism designed to stop the webbing 20 from being unwound in an emergency situation of the vehicle.

The other end of the webbing 20 is led through the hollow portions 14A and 16A toward the rear side of the backrest portion 14 and is then passed through an opening 22 provided in the rear portion of the backrest portion 14 so as to be led out to the rear side of the backrest portion 14. This end of the webbing 20 is then passed through a lead-out portion 26 which is provided in a portion of the backrest portion 14 so as to provide communication between the front and rear sides of the backrest portion 14. The webbing 20 thus led out from the lead-out portion 26 is passed over the shoulders of a child passenger 24, and the distal or leading end of the webbing 18 is retained by a buckle device 28. For this purpose, a tongue plate 30 is attached to the end of the webbing 20, and the tongue plate 30 is inserted into the buckle device 28 to retain the end portion of the webbing 20 by the buckle device 28.

The buckle device 28 is provided so as to stand at a position between the thighs of the child passenger 24, and a portion of the webbing 20 between the tongue plate 30 and the vicinity of the lead-out portion 26 is bifurcated, so that it is possible to fasten the webbing 20 on the shoulders of the child passenger 24.

In place of the above, an arrangement may be employed in which a pair of retractors 18 are mounted within the hollow portion 16A for winding up respective webbings 20, and the distal end portions of the webbings 20 are led out from the lead-out portion 26 and connected to the tongue plate 30.

The structure of the buckle device 28 is similar to that of a buckle device which is employed in an adult passenger securing seatbelt system. Therefore, when the webbing 20 is to be unfastened, it is possible for the tongue plate 30 to be easily pulled out from the buckle device 28 simply by pressing a release button (not shown) which is provided on the buckle device 28. After being pulled out from the buckle device 28, the tongue plate 30, together with the webbing 30, is moved by the wind-up biasing force of the retractor 18. In the course of this movement, the tongue plate 30 abuts against the lead-out portion 26, so that the amount by which the webbing 20 is wound up is appropriately limited.

The rear portions of the backrest and seat portions 14 and 16 in this embodiment which respectively define the hollow portions 14A and 16A constitute in combination a cover portion for covering the intermediate portion of the webbing 20, thereby preventing a portion of the webbing 20 extending from the retractor 18 to the lead-out portion 26 from contacting the seat 12. At the same time, the hollow portions 14A and 16A serve to practically increase the thickness of the backrest and seat portions 14 and 16, thus enhancing the strength of the child passenger securing apparatus 10.

The following is a description of the procedure for using the child passenger securing apparatus 10 in accordance with this embodiment.

The apparatus 10 is mounted on the seat 12 and secured to the seat 12 by means of the adult passenger restraining webbing (not shown).

After the child passenger 24 has been seated in the seat portion 16, the tongue plate 30 is engaged with the buckle device 28, whereby the child passenger 24 is fastened by the webbing 20, as shown in FIG. 1. In this case, the webbing 20 functions as a shoulder webbing for the child passenger 24. To enable the child passenger 24 to be restrained more reliably, other webbings such as a lap webbing may be additionally provided.

In an emergency situation of the vehicle, the retractor 18 stops the webbing 20 from being unwound, and the child passenger 24 is therefore restrained by the webbing 20. Since the backrest portion 14 in accordance with this embodiment has a relatively large thickness, the portion 14 is able to bear a relatively large tension load applied thereto through the webbing 20.

When the tongue plate 30 is pulled out of the buckle device 28, the child passenger 24 is released from the fastening by the webbing 20 and can leave the vehicle. Thus, when the webbing 20 is unwound and rewound, the webbing 20 moves smoothly with a minimized frictional resistance, since it is not in contact with the seat 12 at the rear of the backrest portion 14.

Although in the above embodiment the cover portion which covers a portion of the webbing 20 extending between the lead-out portion 26 and the retractor 18 is formed integrally with the backrest and seat portions 14 and 16, the cover portion may be provided independently of the backrest and seat portions 14 and 16 and secured to these portions when the apparatus 10 is assembled.

Figure 2:
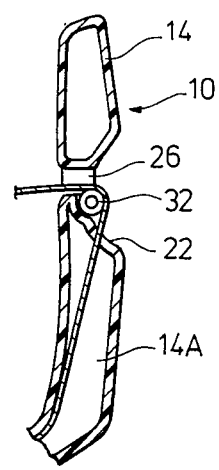
FIG. 2 is a fragmentary sectional view of a modification of the embodiment shown in FIG. 1.

In addition, it is possible to further reduce the friction occurring between the webbing 20 and the backrest portion 14 by disposing friction reducing means such as a roller 32 at, for example, a portion of the backrest portion 14 near the lead-out portion 26 over which the intermediate portion of the webbing 20 is passed, as shown in FIG. 2.

As has been described above, the child passenger securing apparatus according to the present invention is provided with a cover portion which accommodates a portion of a restraining means extending from the retractor to the vicinity of the restraining means lead-out portion. It is therefore possible to increase the thickness of the apparatus body and reduce the friction occurring between the restraining means and the seat.

What is claimed is:

1. A child passenger securing apparatus for use in a vehicle, comprising:
    (a) a seat body for seating a child passenger, having a seat portion and a backrest portion;
    (b) hollow portions formed in said seat and backrest portions and communicating with each other;
    (c) a restraining means mounted on the seat body for restraining the child passenger;
    (d) a retractor for winding up one end portion of the restraining means, said reactor being mounted in the hollow portion of said seat portion, the other end portion of the restraining means being leg out through the hollow portion of said backrest portion from a lead-out formed in said backrest portion which extends completely through the backrest portion; and
    (e) a buckle device secured to said seat portion for disengageably retaining said other portion of the restraining means.

2. A child passenger securing apparatus according to claim 1, wherein said backrest portion has a front wall and a rear wall defining the hollow portion of said backrest and said rear wall is provided with an opening through which said restraining means is passed before being led out from said lead-out.

3. A child passenger securing apparatus according to claim 2, wherein said rear wall has a stepped portion so that the thickness of said backrest is reduced in the vicinity of the lead-out and said opening is formed at said stepped portion.

4. A child passenger securing apparatus according to claim 3, wherein said seat body is integrated in the form of a thin-walled shell construction.

5. A child passenger securing apparatus according to claim 4, wherein said buckle device is provided so as to stand at a position between the thighs of the child passenger.

6. A child passenger securing apparatus according to claim 5, wherein a friction reducing means is disposed at said stepped portion to reduce the friction occurring when said restraining means moves.

7. A child passenger securing apparatus secured to a seat ofa vehicle, comprising:
    (a) a seat body for seating a child passenger including a seat portion and a backrest portion integrated together in the form of a thin-walled shell construction and having a hollow portion defined therein which extends from the seat portion to the backrest portion;

(b) a restraining webbing mounted on the seat body for restaining the child passenger;

(c) a retractor for retracting the child passenger restraining webbing from one end portion thereof and for preventing the webbing from unwinding during an emergency condition of the vehicle, said retractor being disposed in a portion of the hollow portion defined by said seat portion, the other end portion of the child passenger restraining webbing being passed through said hollow portion and led out from a lead-out formed in said backrest portion adjacent the shoulders of the child passenger, wherein saaid lead-out extends completely through the backrest portion;

(d) an opening formed at the rear shell of said backrest portion through which the other end portion of said child passenger restraining webbing is passed before being led out from said lead-out; and (e) a buckle device secured to said seat portion for disengageably retaining said other end portion of said child passenger restraining webbing.

8. A child passenger securing apparatus according to claim 7, wherein said rear wall has a stepped portion so that the thickness of said backrest in the vicinity of the lead-out is reduced and said opening is formed at said stepped portion, whereby frictional contact between the webbing and the vehicle is avoided.

9. A child passenger securing apparatus according to claim 8, wherein said buckle device is provided so as to stand at a position between the thighs of the child passengers.

10. A child passenger securing apparatus according to cllaim 9, wherein a friction reducing means is disposed at said stepped portion so that it is possible to reduce the friction occurring when said restraining webbing moves.

11. A child passenger securing apparatus according to claim 10, wherein said friction reducing means is a roller.

12. A child passenger securing apparatus for use in a vehicle, comprising:

(a) a seat body for seating a child passenger including a seat portion and a backrest portion integrated together int he form of a thin-walled shell construction and having a hollow portion defined therein which extends from the seat portion to the bakcrest portion;

(b) a restraining webbing mounted on the seat body for restaining the child passenger;

(c) a retractor for retracting the child passenger restraining webbing from one end portion thereof and for preventing the webbing from unwinding during an emergency condition of the vehicle, said retractor being disposed within said thin-walled shell construction of said seat body, the other end portion of the restraining webbing being passed through a lead-out formed in the backrest portion which extends completely through both walls of the shell forming the backrest portion so that any load applied to the restraining webbing during an emergency vehicular situation will be borne by both walls of the shell forming said backrest portion;

(d) an oepning formed at the rear shell of said backrest portion through which the other end portion of said child passenger restraining webbing is passed before being led out through said lead-out;

(e) a stepped portion in said rear shell of said backrest portion in the vicinity of said opening for defining a recess in said rear shell that prevents the restraining webbing from rubbing against the vehicle, and (f) a buckle device secured to said seat portion for disengagably retaining said other end portion of said child passenger restraining webbing.

13. The apparatus of claim 12, wherein said buckle device is connected to said retractor through said seat portion so that said webbing is anchored to the seat body at only one point.

* * * * *